United States Patent [19]

Suzuki et al.

[11] Patent Number: 4,665,489
[45] Date of Patent: May 12, 1987

[54] UNMANNED VEHICLE CONTROL SYSTEM AND METHOD

[75] Inventors: Tetsuji Suzuki, Aichi; Susumu Yoshida, Kakamigahara; Hiroshi Ogawa; Yasuyuki Miyazaki, both of Aichi, all of Japan

[73] Assignee: Kabushiki Kaisha Meidensha, Tokyo, Japan

[21] Appl. No.: 704,523

[22] Filed: Feb. 22, 1985

[30] Foreign Application Priority Data

| Mar. 15, 1984 | [JP] | Japan | 59-49467 |
| May 25, 1984 | [JP] | Japan | 59-105907 |
| May 25, 1984 | [JP] | Japan | 59-105908 |
| May 25, 1984 | [JP] | Japan | 59-105910 |
| May 25, 1984 | [JP] | Japan | 59-76917[U] |

[51] Int. Cl.⁴ .......................................... G06F 15/50
[52] U.S. Cl. .................................. 364/424; 180/142; 180/168; 318/587
[58] Field of Search ........................... 364/424, 425; 180/167–169, 141–143; 318/587

[56] References Cited

U.S. PATENT DOCUMENTS

| 4,307,329 | 12/1981 | Taylor | 180/168 |
| 4,329,632 | 5/1982 | Yoshida et al. | 318/587 |
| 4,392,540 | 7/1983 | Michio et al. | 180/142 |
| 4,476,529 | 10/1984 | Nakamura et al. | 180/142 |
| 4,538,698 | 9/1985 | Hashimoto et al. | 180/143 |

Primary Examiner—Gary Chin
Attorney, Agent, or Firm—Schwartz, Jeffery, Schwaab, Mack, Blumenthal & Evans

[57] ABSTRACT

An unmanned vehicle is so controlled as to travel along a guide line in response to command signals transmitted from a fixed host computer. The vehicle includes a driving motor, a steering motor, a driving motor chopper, a steering motor chopper, a speed detector, an offset (misalignment away from the guide line) detector, a main CPU, etc. Since detected offset values are directly feedbacked to the main CPU through a steering control interface and the steering motor chopper is directly controlled by the main CPU through the steering interface, it is possible to eliminate other CPUs conventionally provided for turning on or off both the choppers, separately. Further, since the duty ratio of the steering motor chopper is controlled by taking into account various factors such as offset values, offset increment values, vehicle speeds, steering correcting directions, etc., it is possible to stably correct vehicle steering misalignment at high response speed even when the vehicle is travelling at high speed along the guide line.

8 Claims, 14 Drawing Figures

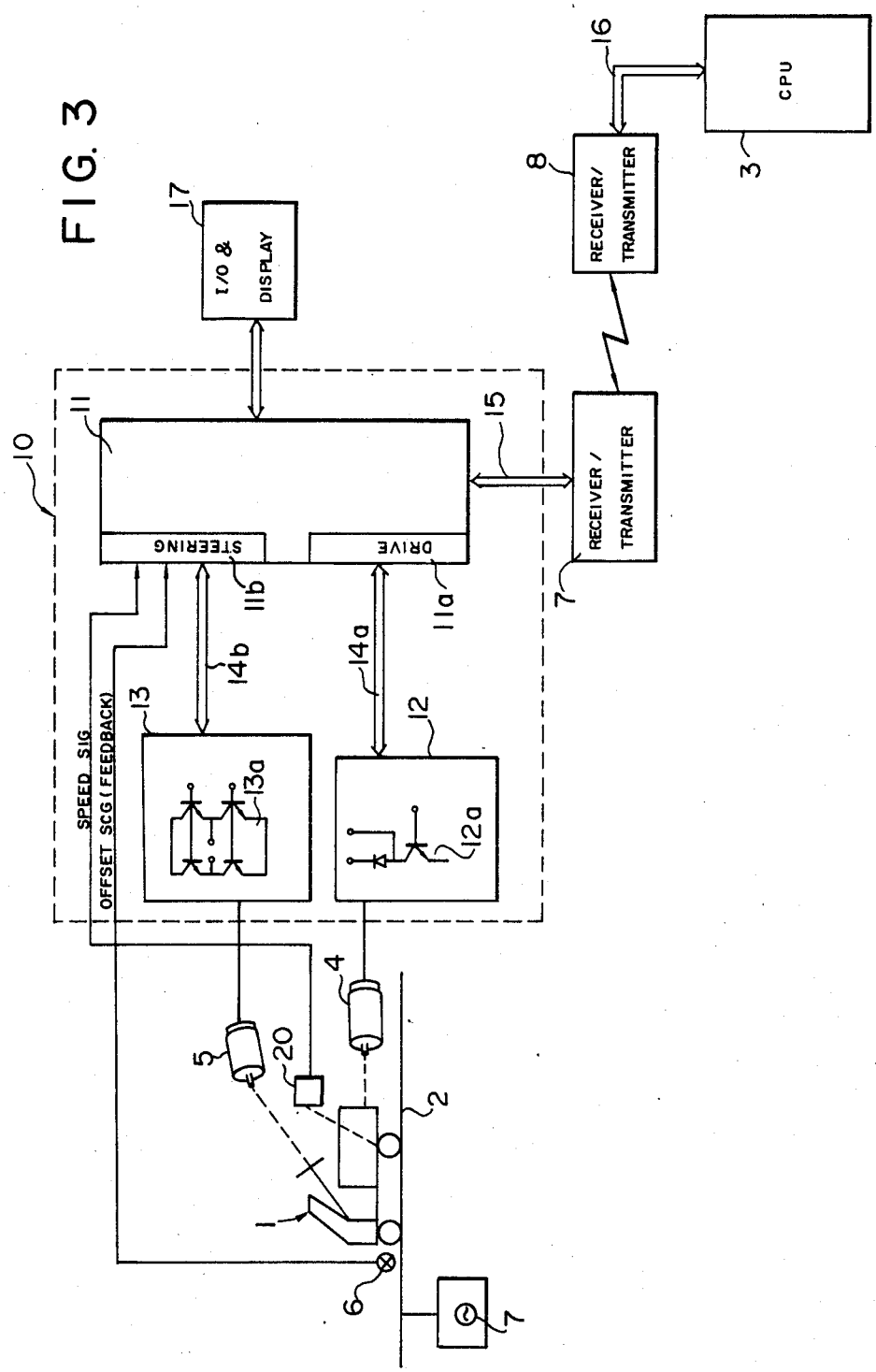

FIG. 8(A)
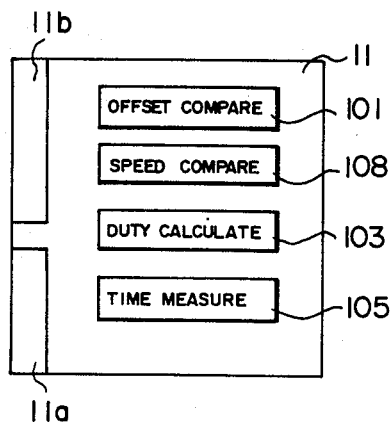
FIG. 8(B)
FIG. 8(C)
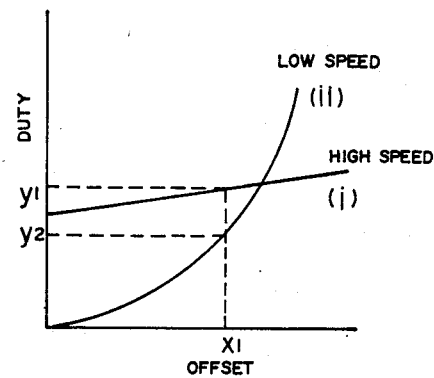
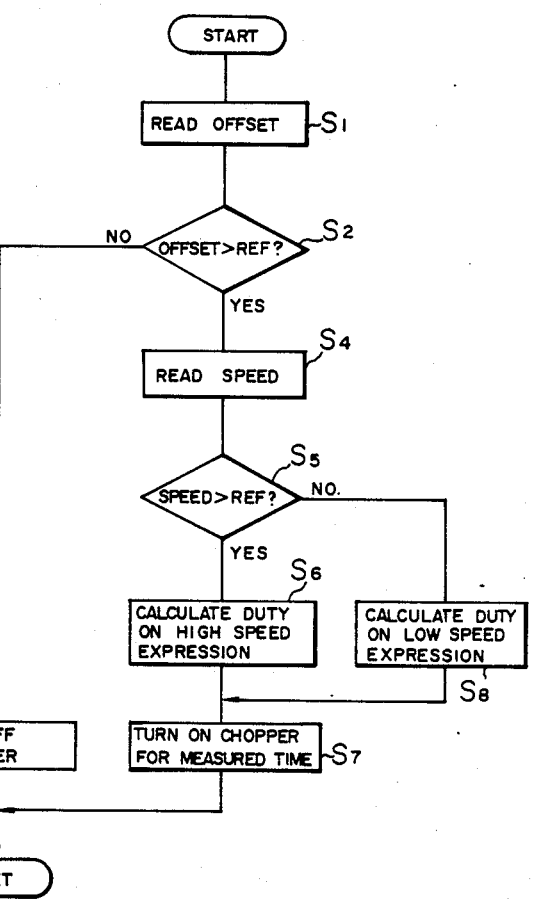

UNMANNED VEHICLE CONTROL SYSTEM AND METHOD

BACKGROUND OF THE INVENTION

1. Field in the Invention

The present invention relates generally to an unmanned vehicle control system and the method, and more specifically to steering device control system and the method incorporated with the unmanned vehicle control system. The unmanned vehicle is a forklift truck, for instance, which is automatically remote-controlled so as to travel along a fixed guide line in response to various command signals transmitted from a fixed host computer. The unmanned vehicle is used for conveying material, semi-finished products, etc. in an unmanned factory, warehouse, etc, for instance.

2. Description of the Prior Art

In general, an unmanned vehicle is driven along fixed guide lines. An alternating current having an appropriate frequency (e.g. 10 kc) is passed through the guide lines to generate a magnetic field near the guide lines. A pair of magnetic field detecting coils are disposed symmetrically with respect to the longitudinal axis of the vehicle body in order to detect a vehicle offset produced when the vehicle skews or is misaligned away from the guide line. To detect vehicle offsets (misalignment) from the guide line, the difference in magnetic field intensity between the two symmetrically-arranged coils is detected. In response to the detected difference signal indicative of vehicle offset, a steering device mounted on the vehicle is actuated by a steering motor in the direction that a detected offset may be reduced into within a dead zone (offset is no longer adjusted). The speed of the steering DC motor can be adjusted by a chopper circuit. The chopper circuit can generate a chopped current the duty ratio of which is freely adjustable by controlling the inputs of the chopper circuit.

Conventionally, however, the offset signals detected by the offset detecting coils are feedbacked to a steering motor control section including the steering motor driving chopper circuit and a chopper controller (microcomputer). Since the main microcomputer is mounted on the vehicle in order to implement various controls other than steering device control, it is rather wasteful or redundant to additionally provide the chopper controller from economical or energy saving standpoint. Further, since the feedback signal is applied to the chopper controller, it is impossible for the main computer to directly self-diagnose the steering device including the steering motor, steering motor chopper circuit, etc.

Further, in the prior-art steering device control system, the speed of steering motor is simply controlled according to the magnitude of detected offset value. In more detail, when the detected offset value is great, the steering DC motor is driven quickly by simply increasing the duty ratio of current supplied from the chopper circuit to the steering motor; when the detected offset value is small, the steering DC motor is driven slowly by simply decreasing the duty ratio of current supplied from the chopper circuit to the steering motor. Therefore, there exists a problem in that the vehicle easily skews away from the guide line beyond control; that is, it is impossible to stably correct the steering misalignment at high response speed, in particular when the vehicle is travelling at relatively high speed.

SUMMARY OF THE INVENTION

With these problems in mind, therefore, it is the primary object of the present invention to provide an unmanned vehicle control system and method which can eliminate a chopper controller provided for the steering motor control section in order to simplify the system configuration, to economize energy and to directly self-diagnose the steering device.

It is the other object of the present invention to provide an unmanned vehicle control system and method which can stably correct the vehicle steering misalignment at high response speed, in particular when the vehicle is travelling at relatively high speed.

To achieve the above-mentioned first object, the unmanned vehicle control system according to the present invention comprises: (a) driving motor means for driving the unmanned vehicle; (b) steering motor means for steering the unmanned vehicle; (c) driving motor chopper means for generating a chopped current supplied to said driving motor means, speed of said driving motor means increasing with increasing duty ratio of the chopped current; (d) steering motor chopper means for generating a chopped current supplied to said steering motor means, speed of said steering motor means increasing with increasing duty ratio of the chopped current; (e) vehicle offset detecting means for detecting an offset value of the unmanned vehicle misaligned away from the fixed guide line and generating an offset signal when the vehicle skews to the guide line; (f) vehicle speed detecting means for detecting vehicle speed and generating a vehicle speed signal; and (g) computer means having (1) drive control interface means for activating said driving motor chopper means in response to command signals transmitted from a fixed host computer to control speed of the unmanned vehicle; and (2) steering control interface means for activating said steering motor chopper means in response to the offset signal generated from said vehicle offset detecting means and the vehicle speed signal generated from said vehicle speed detecting means to control steering of the unmanned vehicle along a fixed guide line.

To achieve the above-mentioned second object, the method of controlling an unmanned vehicle according to the present invention comprises the steps of calculating an appropriate duty ratio of chopper current supplied to the steering motor under consideration of various factors such as offset values, offset increment values, vehicle speeds, steering correcting directions, etc.

BRIEF DESCRIPTION OF THE DRAWINGS

The features and advantages of the unmanned vehicle control system and method according to the present invention over the prior art system and method will be more clearly appreciated from the following description of the preferred embodiments of the invention taken in conjunction with the accompanying drawings in which like reference numerals designate the same or similar elements or sections throughout the figures therof and in which:

FIG. 3 is a diagrammatical view including a schematic block diagram of an embodiment of the unmanned vehicle control system according to the present invention;

FIG. 8(A) is a partial block diagram of a fourth embodiment of the main microcomputer incorporated with the unmanned vehicle control system according to the present invention;

Fig. 8(B) is a flowchart showing control operation of the fourth embodiment of the main microcomputer incorporated with the unmanned vehicle control system according to the present invention; and FIG. 8(C) is a graphical representation showing an exemplary first curve along which steering motor duty ratio is calculated for gently increasing the ratio with increasing offset value when the vehicle is travelling at high speed and an exemplary second curve along which steering motor duty ratio is calculated for sharply increasing the ratio with increasing offset value.

DETAILED DESCRIPTION OF THE PREFERRED EMBODIMENTS

To facilitate understanding of the present invention, a brief reference will be made to a prior-art unmanned vehicle control system with reference to the attached drawings.

Figure 1:
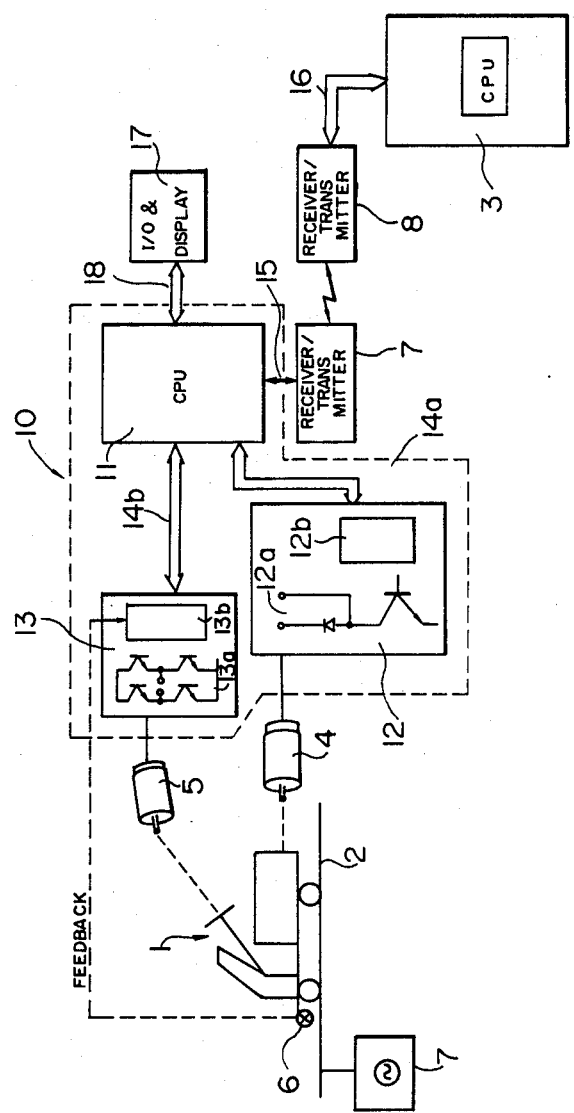
FIG. 1 is a diagrammatical view including a schematic block diagram of a prior-art unmanned vehicle control system.

In FIG. 1, an unmanned vehicle 1 is remote-controlled so as to travel along a fixed guide line 2 in accordance with various command signals generated by a fixed control section (host computer) 3. The vehicle 1 is driven by a driving motor 4 in the forward or rearward direction and further controlled by a steering motor 5 so as to be turned right and left along the fixed guide line 2 by the aid of a pair of offset detecting coils 6 and a guide line oscillator 7 as described in more detail later with reference to FIGS. 2(A) and 2(B).

The driving motor 4 and the steering motor 5 are both controlled by a movable control section 10. The movable control section 10 communicates with the fixed control section (host computer) 3 through a movable receiver/transmitter 7 connected to the movable control section 10 and a fixed receiver/transmitter 8 connected to the fixed control section 3.

The movable control section 10 includes a main microcomputer (CPU) 11, a driving motor control unit 12 and a steering motor control unit 13. The main computer 11 is connected to the driving motor control unit 12 through a data bus 14a and to the steering control unit 13 through another data bus 14b. Further, the reference numeral 15 denotes another data bus connected between the movable main computer 11 and the movable receiver/transmitter 7, the numeral 16 denotes another data bus connected between the fixed control section (host computer) 3 and the fixed receiver/transmitter 8. The reference numeral 17 denotes an input-/output unit including indicators, through which various command signals peculiar to the movable vehicle 1 are inputted or outputted. The numeral 18 denotes another data bus connected between the main computer 11 and the input/output unit 17. In the above prior-art unmanned vehicle control system, only a single vehicle is shown; however, the fixed host computer 3 controls a plurality of unmanned vehicles movable along plural fixed guide lines complicatedly laid within an unmanned factory or warehouse. Further, the movable vehicle 1 can be controlled not only by the fixed host computer 3 but also by the main computer 11 independently or manually (because the vehicle is provided with an accelerator pedal, a steering wheel, etc.) The communication between the fixed host computer 3 and the movable main computer 11 is made by the medium of radio wave, optical communication, etc.

The driving motor control unit 12 includes a driving motor power transistor chopper circuit 12a and a driving motor chopper control unit 12b. The chopper circuit 12a converts a DC voltage into an AC voltage by intermittently cutting off the DC voltage in response to input signals applied from the chopper control unit 12b to bases of chopper transistors. The duty ratio of chopper current can control the speed of the DC driving motor 4. That is to say, the greater the duty ratio, the faster the DC driving motor 4 rotates. Further, in this chopper circuit 12a, the direction in which current flows is not switched. The direction that the driving motor 4 rotates is switched by a pair of other switches (not shown) provided for the driving DC motor 4. The chopper control unit 12b controls the signals applied to the chopper circuit 12a in response to command signals outputted from the main computer 11.

The steering motor control unit 13 includes a steering power transistor chopper circuit 13a and a steering chopper control unit 13b. Similarly, the chopper circuit 13 converts a DC voltage into an AC voltage by intermittently cutting off the DC voltage in response to input signals applied from the chopper control unit 13b to bases of chopper transistors. The duty ratio of the chopped voltage can control the speed of the DC steering motor 5. That is to say, the greater the duty ratio, the faster the DC steering motor 5 rotates. Being different from the driving motor power transistor chopper circuit 12a, the steering motor power chopper circuit 13a can change the direction in which current flow. This is because it is necessary to quickly change clockwise or counterclockwise the direction that the steering motor 5 rotates in the case of the steering operation. The steering chopper control unit 13b controls the signals applied to the chopper circuit 13a in response to command signals outputted from the main computer 11 and feedback signals detected by a pair of offset detecting coils 6.

Figure 2A:
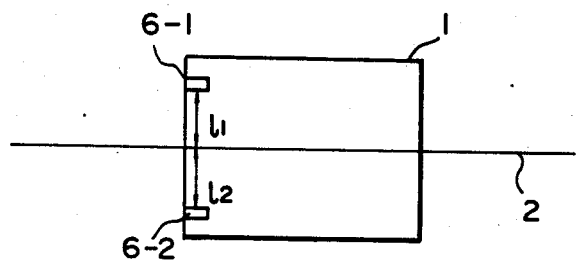
FIG. 2(A) is a diagrammatical view for assistance in explaining a vehicle travelling along a fixed guide line without detecting an offset.
Figure 2B:
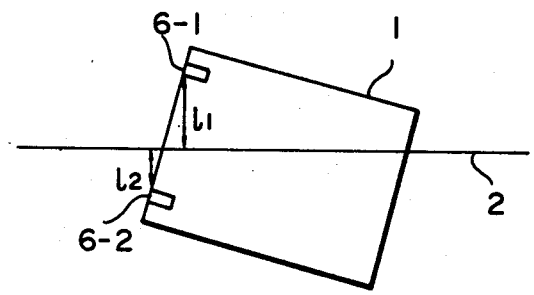
FIG. 2(B) is a diagrammatical view for assistance in explaining a vehicle skewing away from a fixed guide line having an offset.

The operation of the offset detecting coils 6 will be described in more detail with reference to FIGS. 2(A) and 2(B). The two offset detecting coils 6-1 and 6-2 are disposed symmetrically with respect to the longitudinal axis of the vehicle body. An AC current having an appropriate frequency (e.g. 10 kc) is passed through the guide line 2 to generate an alternating magnetic field near the guide line. When the vehicle 1 is travelling correctly along the guide line 2 without misalignment, as shown in FIG. 2(A). Since a first distance $l_1$ between the first coil 6-1 and the guide line 2 is approximately equal to that a second distance $l_2$ between the second coil 6-2 and the guide line 2, a first voltage detected by the first coil 6-1 is approximately equal to a second voltage detected by the second coil 6-2. Therefore, there exists no differential voltage between the two. In contrast with this, when the vehicle 1 skews or is misaligned with respect to the guide line 2 as shown in FIG. 2(B), since the first distance $l_1$ is longer than the second distance $l_2$, the first voltage detected by the first coil 6-1 is lower than the second voltage detected by the second coil 6-2. Therefore, there exists a differential voltage between the two. In response to this differential voltage, the steering motor 5 is driven in the direction that the differential voltage is reduced to approximately zero.

In feedback controlling the steering motor 5, the detected differential voltage is feedbacked to the steering chopper control unit 13b, as depicted by the dashed line in FIG. 1.

The operation of the prior-art unmanned vehicle control system shown in FIG. 1 will be described hereinbelow. The unmanned vehicle 1 is operated in accordance with command signals outputted from the fixed host computer 3. The command signals from the host computer 3 is supplied to the main computer 11 through the fixed and movable receivers/transmitters 7 and 8. The vehicle 1 is controlled in accordance with program stored in the main computer 11 in response to the command signals supplied from the fixed host computer 3.

The driving DC motor 4 is driven by the driving motor control unit 12 in response to various command signals such as "forward", "reverse", 10 km/h speed, etc. generated from the main computer 11. The steering DC motor 5 is driven by the steering motor control unit 13 in response to various command signals such as "leftward", "rightward" etc. (because the guide line 2 is branched) generated from the main computer 11 and additionally the feedback signal obtained by the two offset detecting coils 6-1 and 6-2. Further, the driving and steering motors 4 and 5 are both additionally controllable in accordance with command signals generated from the input/output unit 17 such as travel loop designation, travel speed designation etc. peculiar to each vehicle.

In the prior-art unmanned vehicle control system as described above, however, since the driving motor chopper control unit (microcomputer) 12b and the steering motor chopper control unit (microcomputer) 13b are incorporated with the control system in addition to the main computer 11, these control units 12b and 13b are both wasteful or redundant from economical or energy saving standpoint. Further, since the feedback signal detected by the offset detecting coils 6 is applied to the steering motor chopper controller 13b, it is impossible for the main computer to directly self-diagnose the steering device including the steering motor 5, the steering motor chopper circuit 13a, etc. in case some abnormal conditions (shortcircuit, overcurrent, etc.) occur.

Figure 4:
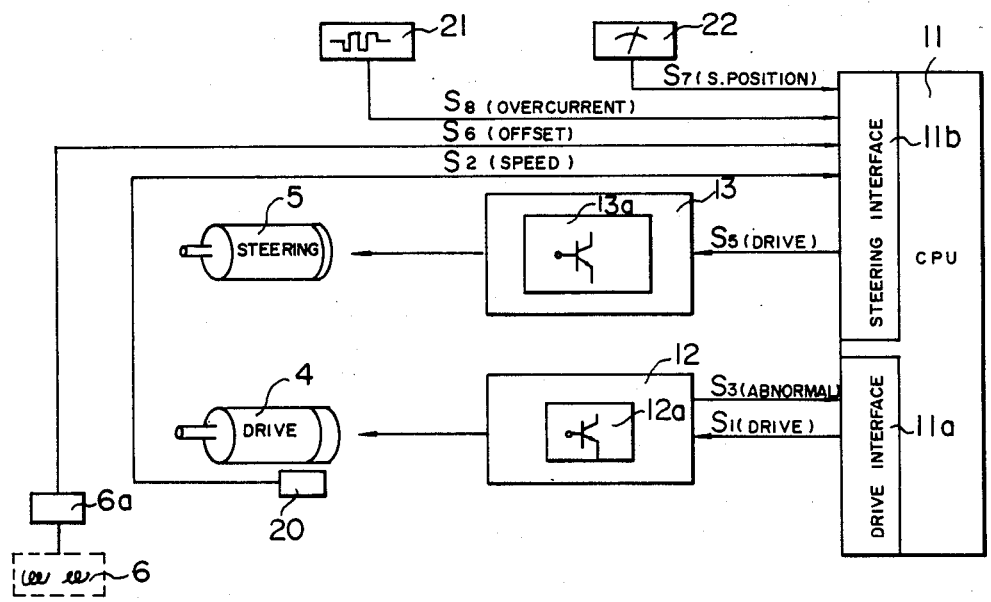
FIG. 4 is a similar more-detailed diagrammatical view including a schematic block diagram of the embodiment of the unmanned vehicle control system according to the present invention.

In view of the above description, reference is now made to the unmanned vehicle control system according to the present invention with reference to FIGS. 3 and 4. In FIG. 3, the offset signals detected by the two offset detecting coils 6 are feedbacked to the main computer 11 through a steering chopper control interface 11b. Further, a vehicle speed signal detected by a vehicle speed sensor 20 is also applied to the main computer 11 through the same interface 11b.

The driving motor control unit 12 includes only the driving transistor chopper circuit 12a and connected to the main computer 11 through a driving chopper control interface 11a. That is to say, the driving chopper control unit 12b shown in FIG. 1 is incorporated with the main computer 11 and the driving control unit 12 is connected to the driving interface 11a through the data bus 14a.

Similarly, the steering motor control unit 13 includes only the steering transistor chopper circuit 13a and connected to the main computer 11 through the steering chopper control interface 11b. That is to say, the steering chopper control unit 13b shown in FIG. 1 is incorporated with the main computer 11 and the steering control unit 13 is connected to the steering interface 11b through the data bus 14b.

Further, in FIG. 4, the reference numeral 6a denotes a differential voltage detector such as a differential operational amplifier for generating an offset signal indicative of the difference in voltage level between the two offset detecting coils 6. The numeral 21 denotes a steering motor overcurrent detector, the detected signal by which is also applied to the main computer 11 through the steering interface 11b. The numeral 22 denotes a steering position sensor, the detected signal by which is also applied to the main computer 11 through the steering interface 11b to guide the vehicle along a branched guide line.

The operation of the control system shown in FIGS. 3 and 4 will be described hereinbelow. A driving motor activating signal $S_1$ is outputted from the main computer 11 through the driving control interface 11a to the driving motor power transistor chopper circuit 12a to drive the vehicle 1 at an appropriate speed in the forward or rearward direction. In the chopper circuit 12a, the duty ratio of DC motor driving current is controlled in response to the signal $S_1$. A vehicle speed signal $S_2$ detected by the vehicle sensor 20 is applied to the main computer 11 through the steering interface 11b (not through the driving interface 11a) to control the steering device according to detected vehicle speed or to indicate the present vehicle speed on an indicator provided in the display 17 shown in Fig. 3. Further, in case some elements (e.g. resistor) included in the chopper circuit 12a detects an abnormally high current, an "abnormal" signal $S_3$ is applied to the main computer 11 through the driving interface 11a to stop the driving motor 4 in an emergency.

A steering motor activating signal $S_5$ is outputted from the main computer 11 through the steering control interface 11b to the steering power transistor chopper circuit 13a to drive the steering device so that the vehicle 1 travels along the designated guide line 2. In the chopper circuit 13a, the duty ratio of DC motor driving current is controlled in response to the signal $S_5$. An offset signal $S_6$ detected by the offset detecting coils 6 is feedbacked to the main computer 11 through the steering interface 11b to control the steering device so that the detected offset value is minimized. Further, in case the overcurrent sensor 21 detects an overcurrent in the steering motor 5, an overcurrent signal $S_8$ is applied to the main computer 11 through the steering interface 11b to stop the steering motor 5 in an emergency. A steering position signal $S_7$ detected by the steering position sensor 22 is applied to the main computer 11 through the steering interface 11b to guide the vehicle 1 along an appropriate guide line whenever the vehicle 1 reaches a branched guide position.

Although not shown in FIGS. 3 and 4, other sensors or switches are provided for the vehicle 1 and these sensor signals are all applied to the main microcomputer 11. These switches are, for instance, a safety bumper switch closed to stop the vehicle when the vehicle is brought into contact with something, an obstacle sensor which outputs a signal when some obstacles are detected near the vehicle, cargo loading/unloading switches closed when a cargo, material, semi-finished product etc. are required to be loaded/unloaded from the vehicle, a battery voltage check switch closed when battery voltage drops below a predetermined level. Further, the main computer 11 receives the signals transmitted from the fixed phost computer 3 and decodes the signals, where necessary.

As described above, in the unmanned vehicle control system according to the present invention, since an offset signal indicative of vehicle misalignment away from the guide line is directly feedbacked to the main computer 11 through the steering interface 11b in real time, it is possible to use the movable main computer effectively, reduce necessary elements mounted on the vehicle, and economize power consumed by the control system, thus improving reliability of the system while realizing a small-sized unmanned vehicle control system. Additionally, there exists a distinguished advantage such that the main computer 11 can directly diagnose the driving chopper control unit 12 and the steering chopper control unit 13.

Figure 5A:
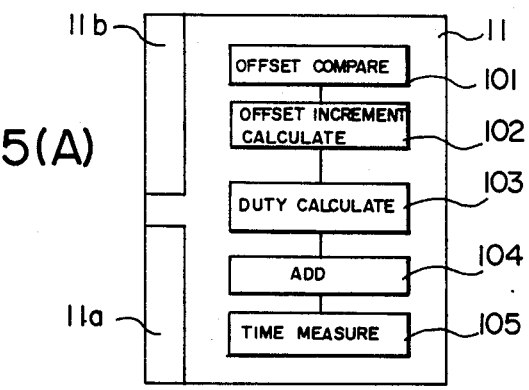
FIG. 5(A) is a partial block diagram of a first embodiment of the main microcomputer incorporated with the unmanned vehicle control system according to the present invention.
Figure 5B:
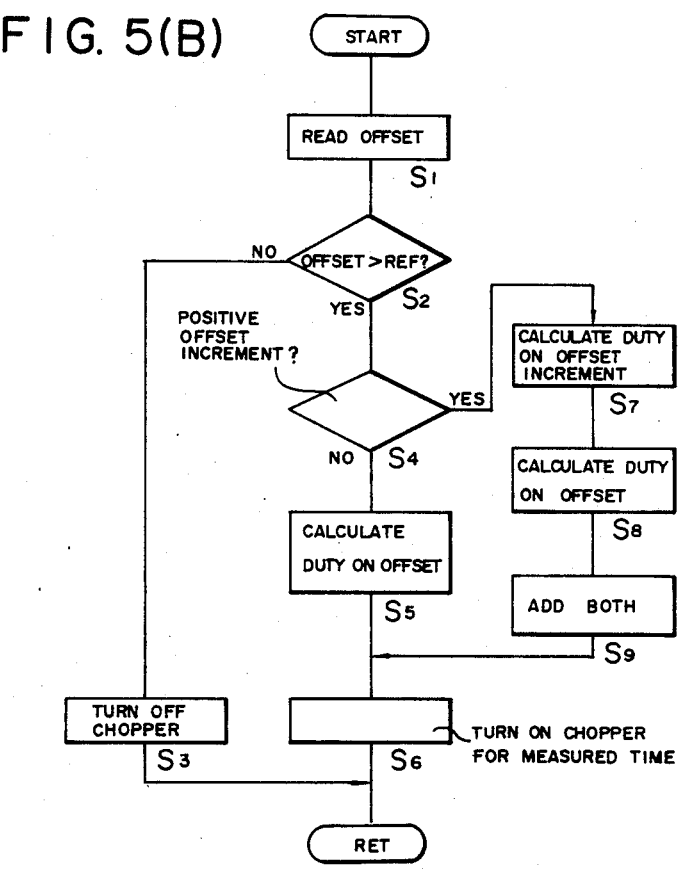
FIG. 5(B) is a flowchart showing control operation of the first embodiment of the main microcomputer incorporated with the unmanned vehicle control system according to the present invention.

The system and the method of controlling the steering device according to the present invention will be described in more detail hereinbelow. FIGS. 5(A) and 5(B) show a first modification according to the present invention. The feature of the first modification is to determine the duty ratio of current supplied to the steering DC motor 5 through the steering chopper 13a under the consideration of offset increment value.

With reference to FIG. 5A, the main computer 11 mounted on the unmanned vehicle is provided with the following means or functions: An offset comparing means 101 compares an offset value detected by the offset detecting coils with a reference value which correspond to a dead zone within which offset is no longer controlled and generates a signal indicative of presence of offset when the detected offset value exceeds the reference value and a signal indicative of absence of offset when the detected offset value is equal to or less than the reference value.

An offset increment calculating mean 102 compares the present offset value with the previous offset value and determines that the offset increment is positive when the present value exceeds the previous value and negative when the previous value exceeds the present value.

A duty calculating means 103 calculates an appropriate duty ratio of current supplied from the steering power transistor chopper circuit 13a to the steering DC motor 5 according to the magnitude of detected offset values or calculated offset increment value. To calculate the duty ratio, it is possible to use a predetermined expression (e.g. a linear expression or a quadric expression). Or else it is possible to select an appropriate duty ratio in accordance with table look-up method. In this case, various duty ratios are previously stored in a memory unit of the main microcomputer 11 according to various offset values or offset increment values. An adding means 104 calculates addition of a first duty ratio calculated on the basis of the detected offset value and a second duty ratio calculated on the basis of the calculated offset increment value. A time measuring means 105 measures a fixed time period. This function can be achieved by counting a predetermined number of clock pulses. The above functions can be implemented in accordance with program stored in a read-only-memory provided in the main computer 11.

The operation of the steering device control system will be explained hereinbelow with reference to a flowchart shown in FIG. 5B. Program control is repeatedly implemented at regular time intervals on the basis of interruption operation to the main computer 11.

First, control reads offset values detected by the offset detecting coils 6 and the differential voltage detector 6a (in step $S_1$). The presence or absence of offset is determined by comparing the detected offset value with a predetermined reference value (dead zone). If the detected offset value exceeds the predetermined reference value, the presence of offset is determined; if the detected offset value does not exceed the predetermined reference value, the absence of offset is determined (in step $S_2$). If the absence of offset is determined in step $S_2$, control turns off the steering power transistor chopper circuit 13a to allow the steering device to be inoperative (in step $S_3$), returning to the original step $S_1$. If the presence of offset is determined in step $S_2$, control further compares the present offset value with the previous offset value (in step $S_4$) and calculates the difference between the two. If the present value exceeds the previous value, a positive offset increment is determined. If the previous value exceeds the present value, a negative offset increment is determined (both in step $S_4$). In the case of a negative offset increment, control calculates an appropriate duty ratio of current passed through the steering DC motor 5 according to the detected offset value and in accordance with table look-up method or an expression (in step $S_5$). Upon calculation of an appropriate duty ratio, control sets counter function and turns on the steering chopper circuit (in step $S_6$). Within the time period measured by the control, the steering chopper circuit 13a is operated so as to supply current having the calculated duty ratio to the steering DC motor 5, so that the detected offset is corrected. When the measured time period has elapsed, control returns to the original step $S_1$. In step $S_4$, if a positive offset increment is determined, control calculates an appropriate duty ratio of current passed through the steering DC motor 5 according to the calculated offset increment value (difference between the present value and the previous value) and in accordance with table look up method or an expression (in step $S_7$). Additionally, control calculates an appropriate duty ratio of current passed through the steering DC motor 5 according to the detected offset value and in accordance with table look-up method or an expression (in step $S_8$). Thereafter, control adds the duty ratio calculated on the basis of the offset increment value in step $S_7$ and the duty ratio calculated on the basis of the offset value in step $S_8$ (in step $S_9$). Thereafter, control advances to step $S_6$ to operate the steering chopper circuit 13a so as to supply current having the calculated and added duty ratio to the steering DC motor 5, so that the detected offset is corrected. When the measured time period has elapsed, control returns to the original step $S_1$. The above control operation is repeated at regular time intervals.

In the first modification of the steering device control system and method according to the present invention, since the duty ratio of the steering DC motor driving current is determined on the basis of both offset values and offset increment values, it is possible to stably control the unmanned vehicle at high response speed. Therefore, even when the vehicle travels at high speed, it is possible to prevent the vehicle from skewing or being misaligned away from the guide line beyond control.

Figure 6A:
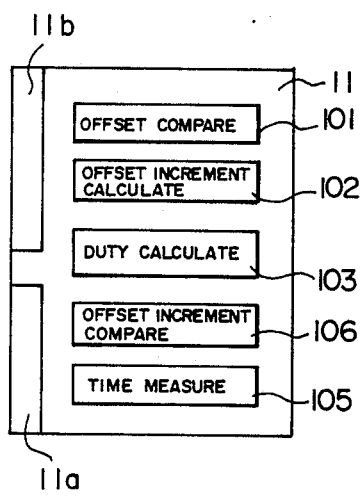
FIG. 6(A) is a partial block diagram of a second embodiment of the main microcomputer incorporated with the unmanned vehicle control system according to the present invention.
Figure 6B:
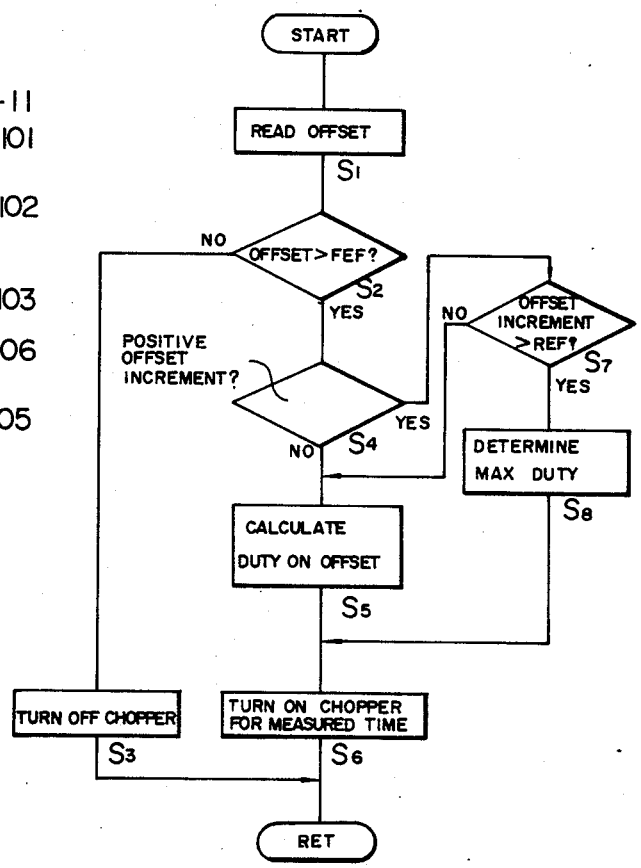
FIG. 6(B) is a flowchart showing control operation of the second embodiment of the main microcomputer incorporated with the unmanned vehicle control system according to the present invention.

Figs. 6A and 6B show a second modification of the system and the method of controlling the steering device according to the present invention. The feature of the second modification is to determine a maximum duty ratio of current supplied to the steering DC motor 5 through the steering chopper 13a when detected and calculated offset increment value exceeds a predetermined reference value.

With reference to FIG. 6(A), the main computer 11 mounted on the unmanned vehicle is provided with an offset comparing means 101, an offset increment calculating means 102, a duty calculating means 103, an offset increment comparing means 106, and a time measuring means 105. The above means 101, 102, 103, and 105 are the same as described with reference to FIG. 5(A), therefore the description thereof being omitted herein.

The offset increment comparing means 106 compares the calculated offset increment with a reference value and outputs a signal indicative of quick offset when the calculated offset increment exceeds the predetermined value.

The above functions can be implemented in accordance with program stored in a read-only-memory provided in the main computer 11.

The operation of controlling the steering device will be explained hereinbelow with reference to a flowchart shown in FIG. 6(B). Program control is repeatedly implemented at regular time intervals on the basis of interruption operation to the main computer 11.

First, control reads offset values detected by the offset detecting coils 6 and the differential voltage detector 6a (in step $S_1$). The presence or absence of offset is determined by comparing the detected offset value with a predetermined reference value (dead zone). If the detected offset value exceeds the predetermined reference value, the presence of offset is determined; if the detected offset value does not exceed the predetermined reference value, the absence of offset is determined (in step $S_2$). If the absence of offset is determined in step $S_2$, control turns off the steering power transistor chopper circuit 13a to allow the steering device to be inoperative (in step $S_3$), returning to the original step $S_1$. If the presence of offset is determined in step $S_2$, control further compares the present offset value with the previous offset value (in step $S_4$) and calculates the difference between the two. If the present value exceeds the previous value, a positive offset increment is determined. If the previous value exceeds the present value, a negative offset increment is determined (both in step $S_4$). In the case of a negative offset increment, control calculates an appropriate duty ratio of current passed through the steering DC motor 5 according to the detected offset value and in accordance with table look-up method or an expression (in step $S_5$). Upon calculation of an appropriate duty ratio, control sets counter function and turns on the steering chopper circuit (in step $S_6$). Within the time period measured by the control, the steering chopper circuit 13a is operated so as to supply current having the calculated duty ratio to the steering DC motor 5, so that the detected offset is corrected. When the measured time period has elapsed, control returns to the original step $S_1$. In step $S_4$, if a positive offset increment is determined, control compares the calculated offset increment value with a reference offset increment value (in step $S_7$). If the calculated offset increment value does not exceed the reference value, control advances to step $S_5$, in which an appropriate duty ratio is calculated according to the detected offset value. If the calculated offset increment value exceeds the reference value in step $S_7$, since this indicates a quick offset, control determines a maximum duty ratio in accordance with table look-up method or an expression (in step $S_8$). Thereafter, control advances to step $S_6$ to operate the steering chopper circuit 13a so as to supply current having the maximum duty ratio to steering DC motor 5, so that the detected offset is corrected. When the time period counted in step $S_6$ has elapsed, control returns to the original step $S_1$. The above control operation is repeated at regular time intervals.

In the second modification of the steering device control system and method of the present invention, since the maximum duty ratio of the steering DC motor driving current is determined when the offset increment value exceeds the predetermined reference value, it is possible to correct the steering of the vehicle so as to be aligned with the guide line at high response speed. Therefore, when the vehicle travels at high speed, it is possible to prevent the vehicle from skewing or being misaligned away from the guide line beyond control.

Figure 7A:
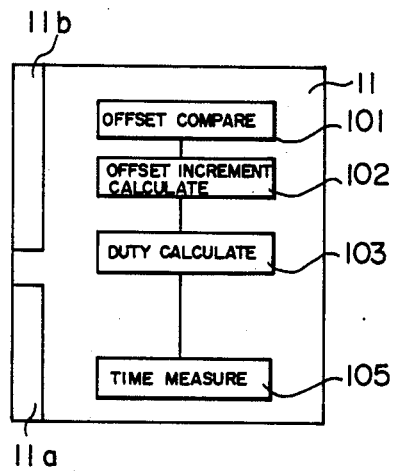
FIG. 7(A) is a partial block diagram of a third embodiment of the main microcomputer incorporated with the unmanned vehicle control system according to the present invention.
Figure 7B:
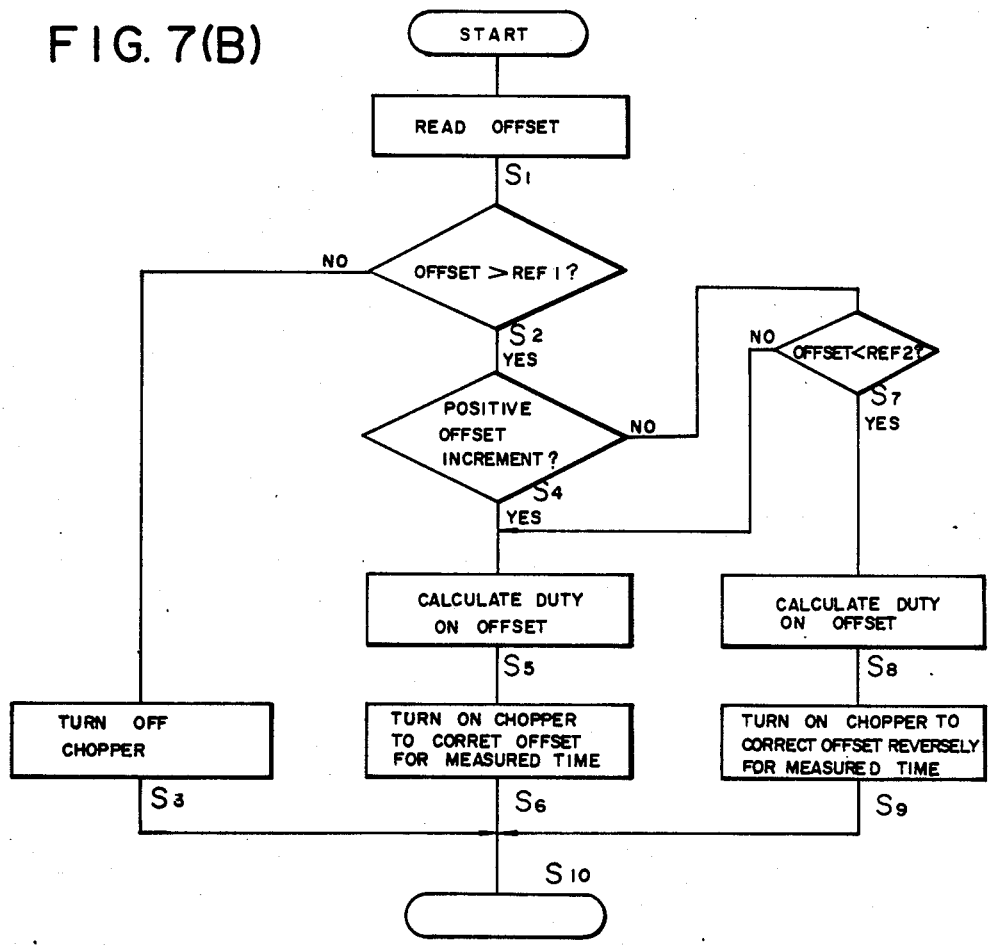
FIG. 7(B) is a flowchart showing control operation of the third embodiment of the main microcomputer incorporated with the unmanned vehicle control system according to the present invention.

FIGS. 7(A) and 7(B) show a third modification of the system and the method of controlling the steering device according to the present invention. The feature of the third modification is to correct the vehicle reversely when the corrected offset decreases to a predetermined reference value or near a dead zone.

The main computer 11 mounted on the unmanned vehicle is provided with an offset comparing means 101, an offset increment calculating means 102, a duty calculating means 103, and a time measuring means 105. The above means have all described with reference to FIG. 5(A) or 6(A), therefore the description thereof being omitted herein.

The operation of controlling the steering device will be explained hereinbelow with reference to a flowchart shown in FIG. 7(B). Program control is repeatedly implemented at regular time intervals on the basis of interruption operation in the main computer 11.

First, control reads offset values detected by the offset detecting coils 6 and the differential voltage detector 6a (in step $S_1$). The presence or absence of offset is determined by comparing the detected offset value with a reference value (dead zone). If the detected offset value exceeds the reference value, the presence of offset is determined; if the detected offset value does not exceed the reference value, the absence of offset is determined (in step $S_2$). If the absence of offset is determined in step $S_2$, control turns off the steering power transistor chopper circuit 13a to allow the steering device to be inoperative (in step $S_3$), returning to the original step $S_1$. If the presence of offset is determined in step $S_2$, control further compares the present offset value with the previous offset value (in step $S_4$). If the present value exceeds the previous value, a positive offset increment is determined. If the previous value exceeds the present value, a negative offset increment is determined (both in step $S_4$). In the case of a positive offset increment, control calculates an appropriate duty ratio of current passed through the steering DC motor 5 according to the detected offset value and in accordance with table look-up method or an expression (in step $S_5$). Upon calculation of an appropriate duty ratio, control begins to count clock signals and turn on the steering chopper (in step $S_6$). Within the time period measured by the control, the steering chopper circuit 13a is operated so as to supply current having the calculated duty ratio to the steering DC motor 5, so that the detected offset is corrected. When the measured time period has elapsed, control returns to the original step $S_1$. In step $S_4$, if a negative offset increment is determined, control compares the present offset value with a second reference offset value which is a little greater than the first reference value (dead zone) (in step $S_7$). If the calculated offset value exceeds the second reference value REF2, control advances to step $S_5$, in which an appropriate duty ratio is calculated according to the detected offset value. If the calculated offset value is less than the second reference value in step $S_7$, control calculates an appropriate duty ratio of current passed through the steering DC motor 5 according to the detected offset value and in accordance with table look-up method or an expression (in step $S_8$). Upon calculation of an appropriate duty ratio, control begins to count clock signals and turn on the steering chopper circuit in the direction that the offset is corrected reversely (in step $S_9$). Within the time period measured by the control, the steering chopper circuit 13a is reversely operated so as to supply current having the calculated duty ratio to the steering DC motor 5, so that the steering device is corrected reversely. When the measured time period has elapsed, control returns to the original step $S_1$. The above control operation is repeated at regular time intervals.

In the third modification of the steering device control system and method of the present invention, since the steering motor 5 is driven reversely in the direction that the steering is corrected reversely when the present offset has been corrected to near the dead zone, it is possible to prevent the steering from being excessively corrected or misaligned beyond the guide line, even if the vehicle is travelling along the fixed guide line at high speed.

FIGS. 8(A), 8(B) and 8(C) show a fourth modification of the system and method of controlling the steering device according to the present invention. The feature of the fourth modification is to calculate the duty ratio of current supplied to the steering DC motor 5 through the steering chopper 13a according to the detected offset value in accordance with two different expressions or tables classified by vehicle speed.

The main computer 11 mounted on the unmanned vehicle is provided with an offset comparing means 101, a vehicle speed comparing means 108, a duty calculating means 103 and time measuring means 105. The above means 101, 103 and 105 are the same as described with reference to FIG. 5(A), therefore the description thereof being omitted herein.

The vehicle speed comparing means 108 compares the detected vehicle speed with a reference value and outputs a signal indicative of high vehicle speed when the detected vehicle speed exceeds the reference value and a signal indicative of low vehicle speed when the detected vehicle speed is less than the reference value.

The operation of controlling the steering device will be described hereinbelow with reference to a flowchart shown in FIG. 8(B). Program control is repeatedly implemented at regular time intervals on the basis of interruption operation to the main computer 11.

First, control reads an offset value detected by the offset detecting coils 6 and the differential voltage detector 6a (in step $S_1$). The read offset value is compared with a reference value REF (in step $S_2$). If the read offset value does not exceed the reference value, since this indicates the absence of offset, control turns off the steering power transistor chopper circuit 13a to allow the steering device to be inoperative (in step $S_3$). If the read offset value exceeds the reference value, since this indicates that the presence of offset, control reads the present vehicle speed detected by the speed sensor 20 (in step $S_4$). The detected speed is compared with a reference speed (in step $S_5$). If the detected speed exceeds the reference speed, since this indicates a high speed, control calculates an appropriate duty ratio of current passed through the steering DC motor 5 according to the detected offset value in accordance with table look-up method or an expression (in step $S_6$). In this step $S_6$, since vehicle speed is determined to be high, the duty factor is calculated on the basis of a first table or a first expression, the duty ratio is so determined as to increase relatively gently with increasing offset value. Upon calculation of an appropriate high speed duty ratio, control begins to count clock signals and turns on the teering chopper circuit (in step $S_7$). Within the time period measured by the control, the steering chopper circuit 13a is operated so as to supply current having the calculated duty ratio to the steering DC motor 5, so that the detected offset is corrected. When the measured time period has elapsed, control returns to the original step $S_1$. In step $S_5$, if the detected speed does not exceed the reference speed, since this indicates a low speed, control calculates an appropriate duty ratio of current passed through the steering DC motor 5 according to the detected offset value in accordance with able look-up method or an expression (in step $S_8$). In this step $S_8$, since vehicle speed is determined to be high, the duty factor is calculated on the basis of a second table or a second expression prepared for when the vehicle is travelling at low speed. In the second table or the second expression, the duty ratio is so determined as to increases relatively sharply with increasing offset value. Upon calculation of an appropriate low speed duty ratio, control begins to count clock signals and turn on the steering chopper circuit (in step $S_7$). Within the time period measured by the control, the steering chopper circuit 13a is operated so as to supply current having the calculated duty ratio to the steering DC motor 5, so that the detected offset is corrected. When the measured time period has elapsed, control returns to the original step $S_1$.

In the fourth modification of the steering device control system and method of the present invention, since the duty ratio of the steering DC motor driving current is determined on the basis of two tables or two expressions which are classified by vehicle speed, it is possible to stably correct the steering at high response speed even when the vehicle is running along the guide line at high speed or at low speed. In the above modification, the vehicle speed is classified into two speeds. However, without being limited to two, it is possible to divide the speed into three or more groups.

As described above, in the unmanned vehicle control system according to the present invention, since a single main computer is mounted on the vehicle and further the detected offset values are directly feedbacked to the main computer through a steering control interface, it is possible to eliminate other computers conventionally provided for activating the driving motor chopper circuit and the steering motor chopper circuit independently, thus reducing system cost, system size, consumed energy, etc. Additionally, since the driving and steering motor chopper circuits are both directly connected to the main computer through the interfaces, it is possible to self-diagnose the driving device and the steering device by the main computer.

Further, in the method of controlling an unmanned vehicle along a fixed guide line according to the present invention, since the duty ratio of current supplied to the steering motor for correcting detected offsets is determined under consideration of various factors such as offset values, offset increment values, vehicle speeds, steering correcting directions, etc., it is possible to stably control the unmanned vehicle so as to travel along a fixed guide line at high response speed even when the vehicle is travelling at relatively high speed.

It will be understood by those skilled in the art that the foregoing description is in terms of a preferred embodiment of the present invention wherein various changes and modifications may be made without departing from the spirit and scope of the invention, as set forth in appended claims.

What is claimed is:

1. An unmanned vehicle control system for driving an unmanned vehicle along a fixed guide line in response to command signals transmitted from a fixed host computer, which comprises:
   (a) driving motor means for driving the unmanned vehicle;
   (b) steering motor means for steering the unmanned vehicle;
   (c) driving motor chopper means for generating a chopped current supplied to said driving motor means, the speed of said driving motor means increasing with increasing duty ratio of the chopped current;
   (d) steering motor chopper means for generating a chopped current supplied to said steering motor means, the speed of said steering motor means increasing with increasing duty ratio of the chopped current;
   (e) vehicle offset detecting means for detecting an offset value of the unmanned vehicle misaligned away from the fixed guide line and generating an offset signal when the vehicle skews to the guide line;
   (f) vehicle speed detecting means for detecting vehicle speed and generating a vehicle speed signal; and
   (g) microcomputer means having:
      (1) drive control interface means for activating said driving motor chopper means in response to command signals transmitted from the fixed host computer to control the speed of the unmanned vehicle;
      (2) steering control interface means for activating said steering motor chopper means in response to the offset signal generated from said vehicle offset detecting means and the vehicle speed signal generated from said vehicle speed detecting means to control steering of the unmanned vehicle along the fixed guide line and in response to command signals transmitted from the fixed host computer to control steering of the unmanned vehicle;
      (3) offset comparing means for comparing an offset value detected by said vehicle offset detecting means with a first reference value corresponding to a dead zone and generating a signal indicative of presence of offset when the detected offset value is more than the first reference value and a signal indicative of absence of offset when the detected offset value is less than the first reference value;
      (4) offset increment calculating means for comparing a present offset value with a previous offset value, calculating a difference between the present offset value and the previous offset value, and generating a signal indicative of positive increment when the present value exceeds the previous value and a signal indicative of negative increment when the previous value exceeds the present value;
      (5) duty ratio calculating means for calculating an appropriate duty ratio of the chopped current supplied to said steering motor according to the detected offset value and the calculated offset increment value;
      (6) adding means for adding a duty ratio calculated basis of the detected offset value and a duty ratio calculated on the basis of the calculated offset increment value;
      (7) time measuring means for measuring a predetermined time period; and
      (8) said microcomputer deactivating said driving motor chopper means in response to an offset absence signal from said offset comparing means and activating said driving motor chopper means for the measured time period in response to an offset presence signal generated by said offset comparing means, when said offset comparing means generates an offset presence signal and further said offset increment calculating means generates a negative increment signal, said duty ratio calculating means calculating a duty ratio only according to the detected offset value to turn on said steering motor chopper means for the predetermined measured time period at the calculated duty ratio, but when said offset comparing means generates an offset presence signal and further said offset increment calculating means generates a positive increment signal, said adding means adding a duty ratio calculated by said duty ratio calculating means according to the detected offset value to that calculated by said duty ratio calculating means according to the calculated offset increment value to turn on said steering motor chopper means for the predetermined time period at the added duty ratio.

2. The unmanned vehicle control system as set forth in claim 1, wherein said microcomputer means further comprises:
   (a) offset increment comparing means for comparing the calculated offset increment value with a second reference offset increment value and generating a signal indicative of a great positive-increment value when the calculated offset increment value is more than the second reference offset increment value and a signal indicative of a small positive-increment value when the calculated offset increment value is less than the second reference offset increment value; and
   (b) said microcomputer deactivating said driving motor chopper means in response to an offset absence signal from said offset comparing means and activating said driving motor chopper means for the measured time period in response to an offset presence signal, when said offset comparing means generates an offset presence signal and further said offset increment calculating means generates a negative increment signal or when said offset increment comparing means generates the small positive-increment value even if said offset increment calculating means generates a positive increment signal, said duty ratio calculating means calculating a duty ratio only according to the detected offset value to turn on said steering motor chopper means for the predetermined measured time period at the calculated duty ratio, but when said offset comparing means generates an offset presence signal and said offset increment calculating means generates a positive increment signal and said offset increment comparing means generates the great positive-increment value, said duty ratio calculating means determining a maximum duty ratio regardless of the calculated duty ratio to turn on said steering motor chopper means for the predetermined time period at the maximum duty ratio.

3. The unmanned vehicle control system as set forth in claim 1, wherein
   (a) said offset comparing means compares an offset value detected by said vehicle offset detecting means with the first reference value and with a second reference value greater than the first reference value and generating a signal indicative of presence of offset when the detected offset value is more than the first reference value, signal indicative of absence of offset when the detected offset value is less than the first reference value, a signal indicative of presence of a small offset when the detected offset value is less than the second reference value and a signal indicative of presence of a great offset when the detected offset value is more than the second reference value;
   (b) said microcomputer deactivating said driving motor chopper means in response to an offset absence signal from said offset comparing means and activating said driving motor chopper means for the measured time period in response to an offset presence signal, when said offset comparing means generates an offset presence signal and further said offset increment calculating means generates a positive increment signal or when said offset comparing means generates a signal indicative of the presence of a great offset even if said increment calculating means generates a negative increment signal, said duty ratio calculating means calculating a duty ratio only according to the detected offset value to turn on said steering motor chopper means for the predetermined measured time period at the calculated duty ratio, and when said offset comparing means generates an offset presence signal and said offset increment calculating means generates a negative increment signal and said offset increment comparing means generates a signal indicative of the presence of a small offset, said duty ratio calculating means calculating a duty ratio to turn on said steering motor chopper means in such a direction as to allow the detected offset to be corrected reversely for the predetermined time period.

4. The unmanned vehicle control system as set forth in claim 1, wherein said microcomputer means further comprises:
   (a) vehicle speed comparing means for comparing a vehicle speed detected by said vehicle speed detecting means with a reference speed value and generating a signal indicative of high vehicle speed when the detected vehicle speed is more than the reference speed value and a signal indicative of low vehicle speed when the detected vehicle speed is less than the reference speed value;
   (b) said microcomputer deactivating said driving motor chopper means in response to an offset absence signal from said offset comparing means and activating said driving motor chopper means for the measured time period in response to an offset presence signal generated by said offset comparing means, when said vehicle speed comparing means generates a signal indicative of high vehicle speed, said duty ratio calculating means calculating a duty ratio according to the detected offset value in accordance with a high-speed calculation expression, but when said vehicle speed comparing means generates a signal indicative of low vehicle speed, said duty ratio calculating means calculating a duty ratio in accordance with a low-speed calculation expression.

5. A method of controlling an unmanned vehicle along a fixed guide line by means of a steering motor driven by a steering motor chopper in response to command signals transmitted from a fixed host computer, which comprises the following steps of:
   (a) detecting an offset value of the unmanned vehicle misaligned away from the fixed guide line;
   (b) comparing the detected offset value with a reference value corresponding to a dead zone;
   (c) if the detected offset is less than the reference value, turning off the steering motor chopper;
   (d) if the detected offset is more than the reference value, comparing a present offset value with a previous offset value;
   (e) if the present offset value is less than the previous offset value, calculating an appropriate duty ratio of steering motor chopper current supplied to the steering motor according to the detected offset value;
   (f) turning on the steering motor chopper for a predetermined time period on the basis of the calculated duty ratio;
   (g) if the present offset value is more than the previous offset value in step (d) above, calculating an offset increment value between the present offset value and the previous offset value;

(h) calculating an appropriate first duty ratio of steering motor chopper current according to the calculated offset increment value;

(i) calculating an appropriate second duty ratio of steering motor chopper current according to the detected offset value;

(j) adding the first and second duty ratios;

(k) turning on the steering motor chopper for the predetermined time period on the basis of the added duty ratios; and (l) repeating the above steps.

6. A method of controlling an unmanned vehicle along a fixed guide line by means of a steering motor driven by a steering motor chopper in response to command signals transmitted from a fixed host computer, which comprises the following steps of:

(a) detecting an offset value of the unmanned vehicle misaligned away from the fixed guide line;

(b) comparing the detected offset value with a reference value corresponding to a dead zone;

(c) if the detected offset is less than the reference value, turning off the steering motor chopper;

(d) if the detected offset is more than the reference value, comparing a present offset value with a previous offset value;

(e) if the present offset value is less than the previous offset value, calculating an appropriate duty ratio of steering motor chopper current supplied to the steering motor according to the detected offset value;

(f) turning on the steering motor chopper for the predetermined time period on the basis of the calculated duty ratio;

(g) if the present offset value is more than the previous offset value in step (d) above, calculating an offset increment value between the present offset value and the previous offset value;

(h) comparing the calculated offset increment value with a reference value;

(i) if the calculated offset increment value is less than the reference value, calculating an appropriate duty ratio of steering motor chopper current supplied to the steering motor according to the detected offset value;

(j) turning on the steering motor chopper for the predetermined time period on the basis of the calculated duty ratio;

(k) if the calculated offset increment value is more than the reference value in step (h) above, determining a maximum duty ratio of steering motor chopper current;

(l) turning on the steering motor chopper for the predetermined time period on the basis of the determined maximum duty ratio, and (m) repeating the above steps.

7. A method of controlling an unmanned vehicle along a fixed guide line by means of a steering motor driven by a steering motor chopper in response to command signals transmitted from a fixed host computer, which comprises the following steps of:

(a) detecting an offset value of the unmanned vehicle misaligned away from the fixed guide line;

(b) comparing the detected offset value with a first reference value corresponding to a dead zone;

(c) if the detected offset is less than the first reference value, turning off the steering motor chopper;

(d) if the detected offset is more than the first reference value, comparing a present offset value with a previous offset value;

(e) if the present offset value is more than the previous offset value, calculating an appropriate duty ratio of steering motor chopper current supplied to the steering motor according to the detected offset value;

(f) turning on the steering motor chopper for a predetermined time period on the basis of the calculated duty ratio in the direction that the detected offset value can be corrected;

(g) if the present offset value is less than the previous offset value in step (d) above, comparing the detected offset value with a second reference value greater than the first reference value;

(h) if the detected offset value is more than the second reference value, calculating an appropriate duty ratio of steering motor chopper current supplied to the steering motor according to the detected offset value;

(i) turning on the steering motor chopper for the predetermined time period on the basis of the calculated duty ratio in the direction that the detected offset value can be corrected;

(j) if the detected offset value is less than the second reference value in step (g) above, calculating an appropriate duty ratio of steering motor chopper current according to the detected offset value;

(k) turning on the steering motor chopper for a predetermined time period on the basis of the calculated duty ratio in the direction that the detected offset value can be corrected reversely; and (l) repeating the above steps.

8. A method of controlling an unmanned vehicle as set forth in claim 7, which further comprises the following steps of:

(m) if the detected offset is more than the first reference value in step (b), then detecting vehicle speed;

(n) comparing the detected speed with a reference vehicle speed;

(o) if the detected speed is more than the reference vehicle speed, calculating an appropriate duty ratio of steering motor chopper current supplied to the steering motor according to the detected offset value in accordance with a first expression to increase duty ratio with increasing offset value at a relatively low rate of increase; and (p) if the detected speed is less than the reference vehicle speed, calculating an appropriate duty ratio of steering motor chopper current supplied to the steering motor according to the detected offset value in accordance with a second expression to increase duty ratio with increasing offset value at a relatively high rate increase.

* * * * *